(12) United States Patent
Wheeler

(10) Patent No.: US 7,680,673 B2
(45) Date of Patent: Mar. 16, 2010

(54) SYSTEM FOR REAL ESTATE SALE MANAGEMENT

(76) Inventor: Cynthia R. Wheeler, 1487 Tinamou Rd., Venice, FL (US) 34293

( * ) Notice: Subject to any disclaimer, the term of this patent is extended or adjusted under 35 U.S.C. 154(b) by 1541 days.

(21) Appl. No.: 10/227,324

(22) Filed: Aug. 23, 2002

(65) Prior Publication Data

US 2004/0039581 A1 Feb. 26, 2004

(51) Int. Cl.
*G06Q 10/00* (2006.01)
*G06Q 30/00* (2006.01)

(52) U.S. Cl. ................ 705/1; 705/14; 705/26

(58) Field of Classification Search ............. 705/1, 705/26, 14
See application file for complete search history.

(56) References Cited

U.S. PATENT DOCUMENTS

| | | | | |
|---|---|---|---|---|
| 5,032,989 | A | 7/1991 | Tornetta | 705/1 |
| 5,664,115 | A | 9/1997 | Fraser | 705/37 |
| 5,736,977 | A | 4/1998 | Hughes | 345/326 |
| 5,754,850 | A | 5/1998 | Janssen | 707/104 |
| 5,794,216 | A | 8/1998 | Brown | 705/27 |
| 5,995,947 | A | 11/1999 | Fraser et al. | 705/38 |
| 6,058,379 | A | 5/2000 | Odom et al. | 705/37 |
| 6,119,229 | A | 9/2000 | Martinez et al. | 713/200 |
| 6,181,867 | B1 | 1/2001 | Kenner et al. | 386/46 |
| 6,181,935 | B1 | 1/2001 | Gossman et al. | 455/433 |
| 6,247,047 | B1 * | 6/2001 | Wolff | 709/219 |
| 6,321,202 | B1 * | 11/2001 | Raveis, Jr. | 705/1 |
| 6,457,005 | B1 * | 9/2002 | Torrey | 707/5 |
| 6,594,633 | B1 * | 7/2003 | Broerman | 705/1 |
| 6,684,196 | B1 * | 1/2004 | Mini et al. | 705/26 |
| 6,883,002 | B2 * | 4/2005 | Faudman | 707/10 |
| 7,254,553 | B2 * | 8/2007 | Fogelson | 705/27 |
| 7,430,555 | B2 * | 9/2008 | Sealand et al. | 707/100 |
| 2003/0069744 | A1 * | 4/2003 | Craig et al. | 705/1 |

OTHER PUBLICATIONS

Sample of Real Estate Listings in MLS, labeled as MRIS, 1997-1998.*
Information on Realtor Workstation, 2000, Metropolitan Regional Information Systems, Inc.*
Information on HomeGain.com, 1999-2002, printed through www.archive.org, date of webpages is in their URL in YYYYMMDD format.*

* cited by examiner

*Primary Examiner*—Naresh Vig
(74) *Attorney, Agent, or Firm*—Gifford, Krass, Sprinkle, Anderson & Citkowski, P.C.

(57) ABSTRACT

In a method for promoting the sale of real estate, a first dealer, such as an independent seller, may offer a commission to a second dealer, such as a professional real estate agent or broker, for the sale of a real estate property. The commission offer may be transmitted from the first to the second dealer through a computer server. The second dealer may also have previously determined a minimum acceptable commission, which may be posted on an administration environment or page maintained by the second dealer. If the commission offered by the first dealer is at or above the second dealer's selected minimum, and the real estate property is in the same general geographic location as the second dealer, then the listing for the real estate property may appear as a listing on the second dealer's administration page.

5 Claims, 2 Drawing Sheets

SYSTEM FOR REAL ESTATE SALE MANAGEMENT

BACKGROUND OF THE INVENTION

I. Field of the Invention

The present invention concerns a system for managing the sale of real estate. More particularly, the present invention concerns a system for listing property, tracking real estate sale transactions and ordering services related to the sale of real estate.

II. Reference to Related Art

A real estate transaction is often a torturous, laborious task. The process is tiring, time consuming, complex, detailed and requires numerous procedures, services and skills in order to arrive at the closing table. A buyer's major purchase of a lifetime often leaves him/her uneasy and frustrated.

The real estate industry is plagued with "old methods" and adversarial positions held by different parties to the real estate transaction. The two primary adversaries are Real Estate Agents and Independent Sellers (For Sale By Owner, commonly "FSBO"). Agents view FSBO signs as "help wanted" signs and often attempt to get the seller to list with their agency.

The agent's primary concern is to list the seller's property in the local Multiple Listing Service (MLS). Generally the seller will offer to pay a commission to the agent only if the agent procures a buyer. The agent states that he/she will keep the seller's home in mind, but rarely does. The truth be told, agents seldom find buyers for their own listings, let alone the FSBO.

Some agents persist in pursuing the FSBO to list with them, emphasizing how their property will gain exposure to local real estate professionals. Often after unsuccessful efforts to market his or her own property, the seller relents and finally lists with the agent. The seller then becomes obligated to pay the listing broker/agent a fee or commission, thus increasing their selling costs by two or three times the amount they originally intended.

For the buyer, real estate shopping begins at the local classified ads or classifieds on the Internet. A shopper eventually identifies a property of interest and then places a call to either a real estate agent or an individual property seller seeking potential buyers. These sellers or agents may place the classified ad to get the initial call from a buyer, but neither the agent nor the independent seller is generally well prepared for the steps that follow.

Buyers that inquire about real estate for sale are not being properly pre-qualified or pre-approved for a mortgage or real estate loan. Due to inexperience, the independent seller or agent may misunderstand an individual buyer's desires and/or the financial criteria required to properly pre-qualify a "prospect." What can they really afford? Who should determine how much they are qualified to purchase? As it stands now, the agent, independent seller or the buyer is making that critical determination!

Agents and independent sellers often forget the primary vehicle that drives the real estate sales process—financing. Having two parties willing to consummate the transaction is not enough. The prospect must also be "ready and able" to fulfill the financial requirements and close the deal. What seller wants to spend time with a hasty agent or buyer making a "non-qualified" offer?

Buyers also expect agents to notify them of all real estate for sale. What agents deliver many times is incomplete information from a variety of sources. This becomes a waste of countless hours in an exhausting search for the ideal. How could this still be possible given today's technology?

The process has barely begun and all parties are setting themselves up for disaster, heartache, embarrassment and a big lesson in wasting time. In the age of fast-paced "everything" the public is looking for a system to deliver real estate at lightning speed. But still they keep doing things the "same old way," slowly and inefficiently.

U.S. Pat. No. 5,032,989, entitled "Real Estate Search and Location System and Method," discloses a method for locating available real estate properties for sale, lease or rental. Specifically, the method uses a centrally located database of available properties which may be accessed by remote stations using a graphical interface to select desired regions or areas of interest from a map.

Finally, U.S. Pat. No. 5,736,977, entitled "Video Real Estate Information Service," discloses an apparatus and method for providing real estate agents and other interested entities with an audio-visual presentation of a particular property. This presentation is capable of being supplied over existing cable, telephone, ISDN or other types of broadband network facilities.

SUMMARY OF THE INVENTION

The present invention is directed to a system for managing the sale of real estate. The system preferably includes a first step of providing a computer server that is accessible via a global computer network.

In a second step, there is provided on the computer server a real estate database that contains property listings that are being offered for sale by a Real Estate Dealer. A Real Estate Dealer includes professional Real Estate Brokers and Agents as well as Independent Sellers seeking to sell their property without an Agent (e.g., FSBO's and Builders).

In a third step, there is provided on the computer server a transaction database that is adapted to store sale documentation relating to the sale of a real estate listing. The term "sale documentation" preferably includes a variety of documents that are necessary for a real estate transaction. Typical examples of sale documents include: real estate offers, real estate counteroffers, survey information, appraisal information, property inspection information, title information or insurance information and any other documentation necessary for closing a real estate sale.

In a final step, sale documentation relating to a property listing is received in the transaction database that is then automatically updated so that a Buyer and Dealer and others can monitor the progress of a sale.

In several alternative embodiments (two-four) and steps, Buyers that desire to use the system are preferably pre-approved through the system for a mortgage or home loan. For example, when the Buyer initially accesses the system he or she is prompted to provide financial information. This financial information is then forwarded to a lending service for processing. Once the Buyer has obtained a pre-approval, he or she is then provided with full access to the system and may make offers to purchase real property utilizing state specific forms. Furthermore, pre-approved Buyers are automatically forwarded listing information for properties that meet their pre-selected property parameters.

In another alternative embodiment, an Independent Seller can offer a commission to professional Agents for the sale of the Independent Seller's property. The commission offer is preferably transmitted from the Independent Seller to Agents through the computer server. Each Agent has previously determined a minimum acceptable commission, which is posted on each Agent's private web page. If the offered commission is at or above the Agent's selected minimum, the Independent Seller's property listing will appear with the Agent's listings in the system 10.

In a further alternative embodiment, Buyers, Dealers and others using the system have access to and can search community information for a selected geographic location or property. This community information is preferably selected from government data and advertisements and includes: environmental data; school data; law enforcement data; news; moving information; home improvement information; home decorating information; furniture information; cleaning information; home restoration information; contractor information; landscaping information; water purification information; well equipment information; pool equipment information; restaurant information; sports facility information; entertainment information; shopping information; and hospital data, etc.

In a still further embodiment, Buyers, Dealers and others using the system have security level access to and can search market analysis information for real estate sales in a selected geographic location. This market analysis information is stored on the computer server and in public records websites.

Finally, in yet another embodiment, the system is used to order real estate service services (e.g., surveys, appraisals, inspection, title work, etc.) and monitor the progress of those services from commencement to completion.

BRIEF DESCRIPTION OF THE DRAWINGS

The various features, aspects and advantages of the present invention will become better understood with regard to the following description, appended claims and accompanied drawings wherein:

DETAILED DESCRIPTION

Figure 1:
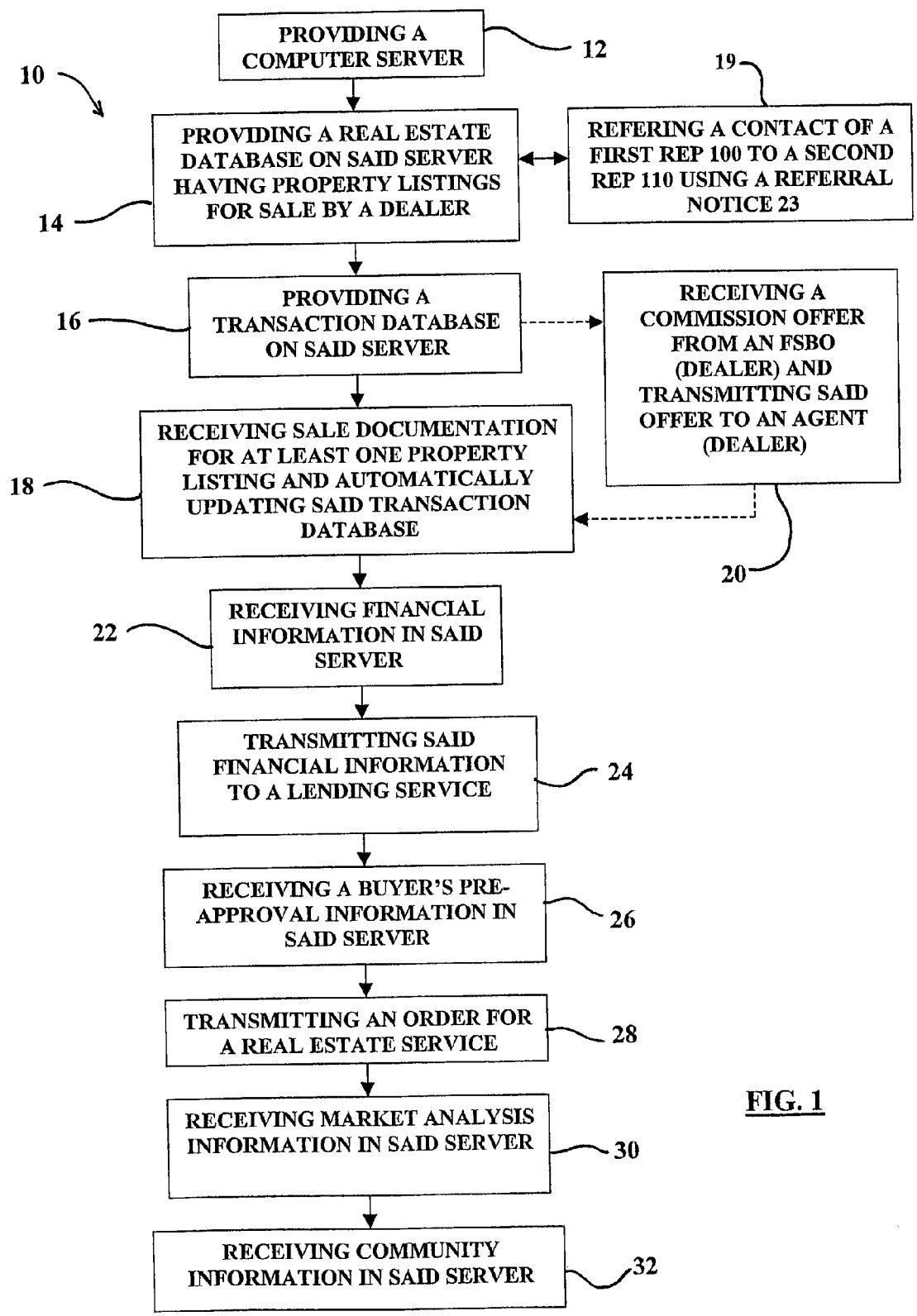
FIG. 1 is a diagrammatic view of a preferred embodiment of the method of the present invention.
Figure 2:
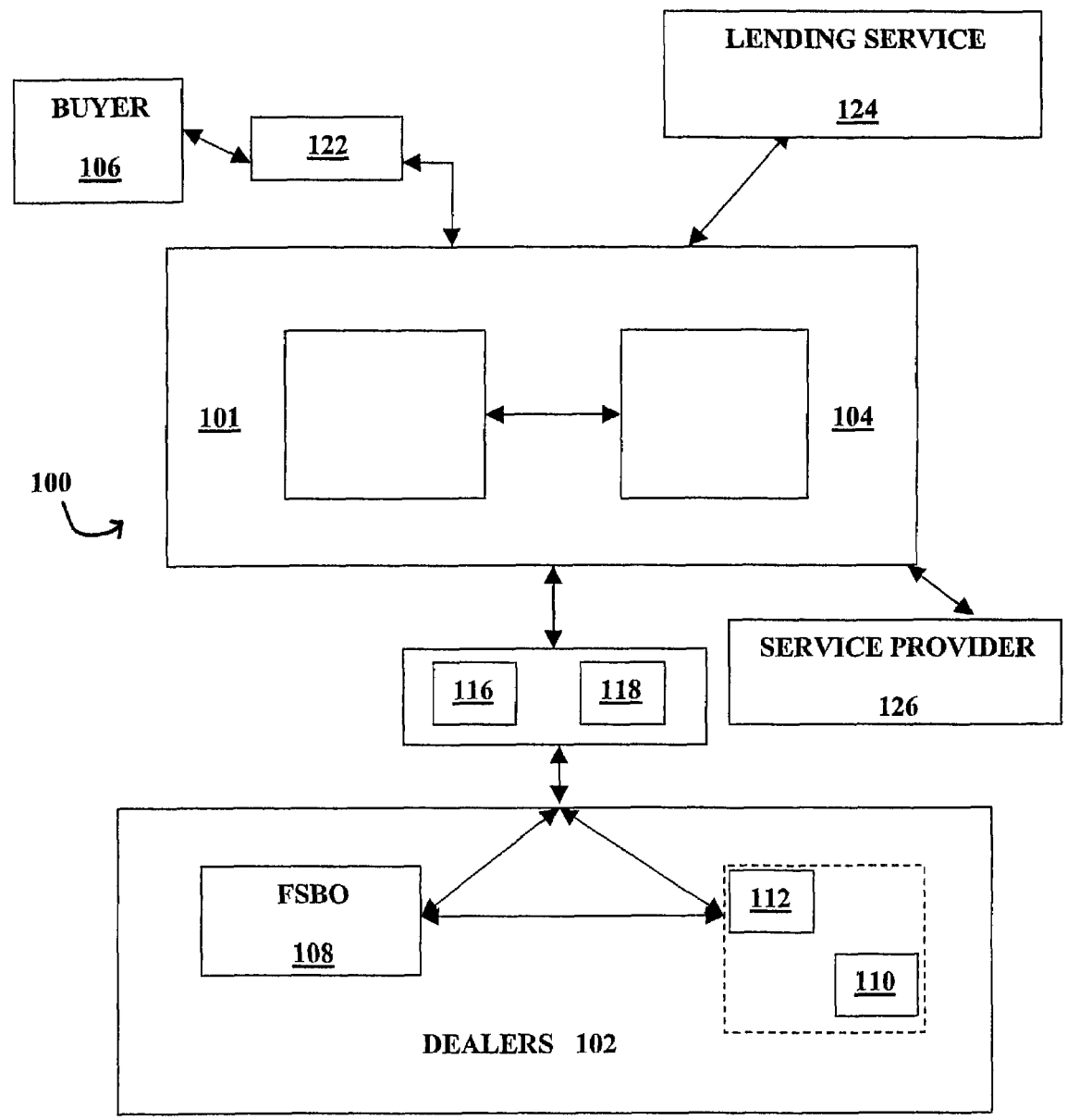
FIG. 2 is a flowchart view showing a preferred embodiment of the present invention.

Referring now to FIGS. 1 and 2, there is shown a preferred embodiment of a system for managing the sale of real estate 10. Preferably, the system 10 includes a first step 12 of providing a computer server 100. In a second step 14, there is provided a real estate database 101 having property listings that are being offered for sale through a Real Estate Dealer 102. In a third step 16, there is provided a secure transaction database 104 that is adapted to receive and store sale documentation. In a fourth step 18, sale documentation related to the sale of a property listed in the real estate database 101 is received into the transaction database 104. The receipt of the sale documentation results in the transaction database 104 being updated so that a real estate Buyer 106, Dealer 102 or third party can monitor the progress of the sale of the property.

As used herein, the term "Dealer" 102 refers, unless otherwise indicated, collectively to Independent Sellers of real estate (i.e., property being offered For Sale By Owner "FSBO" 108 or a Builder 112) and Real Estate Professionals ("REPs" 110) including brokers (for the buyer, seller or both) and agents. The REPs 110 also include broker/agents that are affiliated with the NATIONAL ASSOCIATION OF REALTORS® (NAR) or their local Real Estate Board of Realtors MLS (Multiple Listing Service) as well as broker/agents that are not affiliated with the aforementioned organizations. FSBO's and Builder's can also be collectively referred to herein as non-agent sellers.

In a first step 12, there is provided a computer server 100. Preferably, the computer server 100 is a centrally located network computer server that is accessible via a global computer network such as the Internet and capable of storing database information. However, it will be appreciated that the system 10, including the server 100 and its associated databases 101, 104 can also be accessed using any other commercially available communication systems, e.g., wireless access, telephones (cellular or land lines), radio, etc. and/or devices, e.g., personal computers, PDA's, mini-computers, laptop computers, etc.

Still referring to FIGS. 1 and 2, in a second step 14 there is provided a real estate database 101 having property listings being offered for sale through a real estate Dealer 102. The real estate database 101 is located on the computer server 100 and is accessible via a global computer network such as the Internet or another communication system or device as discussed above.

The property listings in the real estate database 101 are divided into three categories: 1) property listings being offered for sale by FSBOs 108; 2) property listings being offered for sale by a REP 110, and; 3) property listings being offered for sale through Builders 112. The real estate listing database 101 is not limited to a particular type of real estate or listings from a select group of exclusive professionals. Rather, the real estate database 101 is structured to include residential, commercial and industrial real estate listings and new and planned real estate construction from all manner of sellers.

Property description information is provided for each property listing in the real estate database 101. Property description information is well known in the art and includes, but is not limited to, such things as a photographs and/or virtual tours of the property, location information, dimensions, listing of amenities, mandatory disclosure information, and pricing and sale information.

Still referring to FIG. 2, a Dealer's 102 access to the real estate database 101 is preferably provided via a global computer network such as the Internet through a public 116 or a private 118 personal administration page (i.e., web pages or websites) located on the server 100. In a private 118 (preferably secure) administration page, the Dealer 102 manages the Dealer's 102 property listings on the real estate database 101 by adding or deleting a listing or modifying the property description information for an existing listing. When a Dealer 102 does add, delete or modify a property listing, an electronic notice (e.g., email) is preferably transmitted to any other participating Dealer 102 or Buyer (as discussed below) to inform those participants of the change. On the public 116 administration page, a Dealer 102 preferably provides publicly viewable links to the Dealer's 102 property listings on the real estate database 101 such that other Dealers 102, Buyers 106, sellers or others using the system can view the page 116 and obtain property description information for each of the Dealer's 102 listings.

Referring to FIG. 1, as a first alternative step 19, using the system 10 a first REP 110, that is contacted by a Buyer 106 or seller that is interested in a listing outside of the REP's 110 geographic location can refer that contact to a second REP 110. Preferably, the first REP 110 lists the Buyer 106 or seller as a contact on the first REP's private administration page 118. The first REP 110 then transmits though the system 10 a referral notice 23 to at least one second REP 110 who is located in the relevant geographic area. Preferably, the referral notice 23 includes an agreement to pay a referral fee (e.g., 25% of commission) to the first REP 110. It will be also appreciated that the second REP 110 can be a combination of REPs 110; from a single REP 110 that works for the same company as the first REP 110 to a group of REPs 110 that have no corporate affiliation with the first REP 110. Upon acceptance of the referral notice 23 (including the referral fee) by a second REP 110, the Buyer 106 or seller contact information is automatically transferred to the second REP's 110 private administration page 118.

Referring to FIG. 2, as a second alternative step 20, a first Dealer 102 can offer a commission to a second Dealer 102 for the sale of one or more of the first Dealer's listed properties. For example, Dealers 102 that are Independent Sellers 108 or Builders 112 can use their personal administration pages to offer a commission for the sale of the Independent Seller's 108 or Builders 112 property(ies) to one or more REPs 110. In such an example, the Independent Seller 108 or Builder 112 posts a commission offer to his or her private administration page 118. The commission offer is also transmitted through the computer server 100 to REPs 110. It will be appreciated that the commission offer may be limited to REPs 110 located within the same geographic area as Independent Seller's 108 or Builder's 112 listed property(ies). Each REP 110 will have previously determined a minimum commission that he or she will accept for selling a property. This minimum acceptable commission is posted to a REP's 110 private administration page 118 and stored on the computer server 100. If an offered commission is at or above REP's 110 selected range, the computer server 100 will automatically display the Independent Seller's 108 or Builder's 112 listings among the REP's 110 other listings on the REP's 110 public administration page 116. The ability of Independent Sellers 108 or Builders 112 to offer a commission to one or multiple REPs 110 provides the advantage of allowing the REP 110 to obtain another property listing while providing Independent Sellers 108 or Builders 112 with the ability to offer a commission without an exclusive listing contract. It must be noted that commission offers are not limited to the above example and can be arranged between any combination of Dealers 102 or even between a Buyer 106 and a Dealer 102. For example, a Buyer 106 looking for a residence in an exclusive location can use the system 10 to offer a commission (by posting the commission offer on the Buyer's administration page and/or transmitting to the server 100) to a REP 110 to find an available property in that location.

Referring to FIGS. 1 and 2, a Buyer 106 or potential purchaser of property will preferably access the real estate database 101 through a general-public administration page 120 (e.g., a system home page). Alternatively, the Buyer 106 will access the real estate database 101 through the Buyer's 106 own personal administration page 122. The Buyer's 106 personal administration page 122 is preferably a secure private page, but it may be adapted to permit limited or general access by a third party (e.g., a lender, real estate management service or other real estate service provider). As a further alternative, a Buyer 106 can access the real estate database 101 using a telephonic access system 121. Specifically, a Buyer 106 can dial a toll free number listed on a for-sale sign, classified advertisement, etc., to access the computer server 100 to obtain property information. The real estate database 101 translates data into voice (or may use touch-tone) and relays limited property information to the Buyer 106. After dialing into the server 100, the Buyer 106 is also encouraged to access the system 10 to become pre-approved or pre-qualified by a preferred lender 124. Additionally, the system 10 captures the Buyer's 106 telephone number and relays that information to the Dealer 102 and the local lender's private administration page 128. The Dealer 102 and local lender can then use the captured information to initiate personal contact with the Buyer 106.

In a third alternative step 22, a Buyer's financial information is received in the system 10. More particularly, to ensure that the Buyer 106 is a good "prospect" to purchase property, upon first accessing the system 10 and server 100, the Buyer 106 is prompted to transmit (using a secure electronic form) the Buyer's 106 financial information (employment information, economic data, credit history, etc.) through the server 100 of the system 10 to a lending service 124 to try to obtain pre-approval or pre-qualification for a specific loan or mortgage amount. After the financial information is received in the server 100, it is then, in a third alternative step 24, transmitted from the computer server 100 to a lending service 124 for pre-approval or pre-qualification processing. The lending service 124 then notifies the Buyer 106 of the Buyer's approval or requests additional information via electronic media or personal contact. Alternatively, the Buyer's financial information may be transmitted directly to the lending service 124.

Additionally, the Buyer 106 will transmit to the server 100 property parameter information ("PPI") which describes the type of property the Buyer is interested in purchasing (e.g., property size, price, amenities, type: business, residential, commercial, etc). The PPI may also be posted on the Buyer's private administration page 128. The Buyer is assisted in preparing and transmitting each information set (financial and PPI) by the use of online electronic forms and questionnaires. Once entered on the system 10, the Buyer's PPI can be accessed by the Buyer's REP; financial information can preferably only be accessed by the lender.

In a fourth alternative step 26, the system 10 receives the Buyer's pre-approval or pre-qualification information. Specifically, once a Buyer 106 has submitted his or her financial information and PPI, but is not pre-qualified or pre-approved, the Buyer 106 is permitted to browse and search the real estate listing database 101, but is not provided with detailed property information or contact information. Therefore, the Buyer 106 can use the system 10 to search for selected properties but will not be able to submit offers to purchase property in the real estate database 101 until the Buyer 106 has received a pre-approval or pre-qualification for a particular loan amount. More, specifically, when a Buyer 106 obtains a pre-approval or pre-qualification, the lending service 124 notifies the system 10 such that the Buyer 106 is thereafter permitted secure level access to the Dealer's 102 information located on the system 10.

Once a Buyer 106 is pre-approved or pre-qualified, the lending service 124 will post the Buyer's 106 purchasing limit on the Buyer's private administration page 128. Buyers 106 that cannot obtain a pre-approval on the first submission may request to re-apply with alternative lenders. Apartment/Rental information will be provided for interim or alternative solutions to purchasing. If the Buyer 106 was obtained though a specific Dealer's 102 web page, once a Buyer 106 is either pre-qualified or pre-approved, that specific Dealer is notified that the visiting Buyer 106 now is pre-qualified or pre-approved. As discussed above, the pre-approved or pre-qualified Buyer 106 is permitted to browse and search for real estate property listings, property descriptions and contact information for properties that meet the Buyer's 106 PPI and can make offers to purchase.

Still referring to FIGS. 1 and 2, in a third step 16, there is provided a transaction database 104 that is adapted to store sale documentation. The types of sale documentation utilized in real estate transactions are well known in the art, although such documentation typically includes documents relating to offers, counteroffers, disclosures, appraisals, surveys, financing information, insurance information, title transfer documentation, and any other documents necessary to close a real estate sale. The transaction database 104 is preferably a computer database that is centrally located along with the real estate database 101 on the computer server 100 and accessible via a global computer network (or other communication system or device discussed above). Thus, the databases 101, 104 of the system 10 can be stored on a single computer server 100 or, alternatively, on multiple servers.

Once a real estate Buyer 106 identifies a property listing in the real estate database 101 that he or she is interested in purchasing, the Buyer 106 or the Buyer via the Buyer's REP, contacts a Dealer 102 for that property via that Dealer's 102 public administration page 116 to commence the purchase of the property. In this regard, the system 10 provides a centralized system that is used to make offers, negotiate a transaction or order a real estate service in order to monitor, order, transact and process an entire real estate transaction from commencement to completion. Applicable real estate services include, but are not limited to, using the system 10 for such things as offers, contract information and terms, loan applications, loan progress tracking and approvals, listing and selling party information, buyer information, title orders, commitments, problems and resolution, property information, appraisal orders, appraised value, property appraisal conditions or repairs, various inspection orders, inspection conditions or repairs, survey orders, clearance problems and resolutions, insurance orders, binders and policy amount. Users of the system preferably have secure level access and are notified by their preferred electronic method of relevant status changes and updates to individual transactions. The system also preferably allows electronic signatures and can be structured, through the use of the proper document to include in the sale of a business the good will associated with that business.

The sale documentation is stored and presented as electronic forms (i.e., electronic versions of standard forms necessary to complete a real estate sale) that can be easily filled out online and electronically submitted to the server 100. Preferably, all sales documentation is auto populated (i.e., automatically filled out). Therefore, once information such as a Buyer's 106 financial information or a property's legal description are entered into the system 10, that data is locked into the system 10 and (as necessary) automatically inserted into the appropriate sales documentation. Only a user that has an appropriate level of security access can thereafter modify the data. The Dealer 102 is notified of the offer and such offer will be accessed through the Dealer's 102 personal administration page 118. Offers, counter offers and required disclosure forms are preferably filled out online using portable document format (PDF) or other types of electronic documents having alterable fields. Upon execution of contracts, all document fields are locked and only addendum forms may be used for corrections. Additionally, the PDF forms may be printed and transmitted via facsimile or faxed via computer. Upon fully executing the contract, the Dealer 102 will complete the electronic PDF version.

In this regard, in a fourth step 18, sale documentation related to the sale of a property listed in the real estate database 101 is received into the computer server 100 and stored in the transaction database 104. As the sale documentation (such as the Buyer's offer) is received in the server 100, the transaction database 104 is automatically updated to reflect the current status of the sale.

It will be appreciated that traditional paper forms and documents can also be faxed into the system 10 or can be electronically scanned and transmitted to the system 10. It will also be appreciated that the server 100 and transaction database 104 will preferably include security software such that any sale documentation received into the system may be selectively blocked from the view of any unauthorized parties.

As discussed above, the receipt of sale documentation into the server 100 and transaction database 104 results in the transaction database 104 being automatically updated so that a real estate Buyer 106, Dealer 102 or a third party can monitor the progress of the sale of the property. This update will preferably take the form of a modification to an index of documents and services required for the sale of the property. Specifically, as a service or electronic form is completed and an electronic sale document is received by the transaction database 104, an index of documents related to the transaction is automatically updated to indicate that that task has been completed. Preferably, copies of all sale documents to a specific transaction are received into the transaction database 104 and are accessible according to the user's security level.

The use of the transaction database 104 permits the coordination and ordering of a real estate service (discussed above) to be accomplished electronically. Therefore in a fifth alternative step 28, the system 10 permits Buyers 106, Sellers and Dealers 102 to select and electronically order a real estate service(s), preferably from "preferred service providers" 126. A preferred service provider 126 pays a fee to be identified in the system 10 and can be required to meet or exceed certain quality standards in order to be permitted to remain on the system 10. As the preferred service provider 126 performs its selected service, the service provider 126 will, as described above, transmit all necessary sale documentation through the computer server 100 to the transaction database 104 such that the transaction database 104 is continuously updated regarding the status of the sale. Alternatively, a Buyer 106 can order a real estate service from a service provider that is not associated with the system 10. The transaction database 104 can thereafter be updated by any person or entity involved with the sale (e.g., the Buyer 106, the Buyer's REP 110, a lender or a Dealer 102 with secure access) to indicate that the service has been completed. Notices can also be transmitted to the service provider inviting it to become affiliated with the system 10.

As a sixth alternative step 30, a user of the system 10 can perform a Comparative Market Analysis ("CMA"). In a CMA, data from a selected group of property listings from the real estate database 101 are electronically compared and contrasted to provide the user with a comprehensive market overview. The data for the CMA is taken from listing information in the system 10 as well as imported listing data from public information and record databases. In performing a CMA, the user selects the type of data that he or she desires to compare (e.g., only prices of sold properties in a given area (appraisers), the price of all sold, listed, pending or expired properties in a given area (Dealers)). Preferably, the user will pay a fee for each category of data used in the CMA. Furthermore, the display of data categories can be controlled based upon the users level of access. For example, a FSBO is preferably able to access all categories of data, while an appraiser is only able to access data related to sold listings. Using this function, a user of the system (such as an appraiser) is able to adjust or set the price of a real estate listing to reflect current market conditions.

As a seventh alternative step 32, Buyers 106, Sellers and Dealers 102 of the system 10 are provided with Community Information for a particular geographic area. Preferably, the Community Information includes data, information and advertisements concerning schools, the environment, law enforcement, news, moving, home improvement and décor, furniture, cleaning, restoration, construction contractors, landscaping, water purification, well equipment, pool equipment, restaurants, sports facilities, entertainment, shopping and hospitals. This Community Information is preferably provided to the system through paid advertisement, but in some cases may also be provided through access to government records (FBI crimes statistics, SAT scores, state performance examination results, tax records, etc.).

Finally, in an eighth alternative step 34, in order to cease monthly billing or open a listing slot Dealers 102 must complete an exit survey regarding the sale of the property. The information from the survey is stored on the server 104 for further use in gathering and reviewing property information that may be utilized, for example as data in a CMA.

Although the present invention has been described in considerable detail with reference to a preferred embodiment thereof, other versions are possible. Therefore, the spirit and scope of the appending claims should not be limited to the description of the preferred embodiment contained herein.

I claim:

1. A method for promoting the sale of real estate comprising:
   providing a computer server comprising:
   a first administration environment for a first dealer and a second administration environment for each of a plurality of second dealers, each of the second dealers being at least one of a real estate agent or a real estate broker and each of the second dealers having a minimum acceptable commission rate;
   a real estate database having at least a minimum acceptable commission rate by each of the second dealers, and property listing for properties being offered for sale by the first dealer;
   said first dealer creating a new property listing for sale and a commission offer to sell the new property listing on said first administration environment;
   said computer server receiving from the first administration environment the new property listing and the commission offer to sell the new property listing;
   said computer server displaying the new property listing on said first administration environment of said first dealer;
   said computer server identifying the second dealers within same geographic area as the property listing and having the minimum acceptable commission rate that is at least equal to or less than the offered commission from the first dealer; and
   said computer server transmitting and displaying said new property listing information on the second administration environment of each of the identified second dealers.

2. The method of claim 1, further comprising the step of providing on said computer server a transaction database adapted to electronically store sale documentation.

3. The method of claim 1, wherein said first dealer is an independent seller.

4. The method of claim 1, wherein said first dealer is a builder.

5. The method of claim 1, wherein said commission offer is limited to a second dealer within a same geographic area as the property listing.

* * * * *